United States Patent [19]

Fava

[11] Patent Number: 4,769,975
[45] Date of Patent: Sep. 13, 1988

[54] MACHINE FOR PACKAGING FOOD PRODUCTS OF FLAT, WIDE TYPE, IN PARTICULAR PASTA DENOMINATED 'LASAGNA'

[75] Inventor: Enrico Fava, Cento, Italy

[73] Assignee: Essiccatoi Fava S.p.A., Cento, Italy

[21] Appl. No.: 54,967

[22] Filed: May 28, 1987

[30] Foreign Application Priority Data

Jun. 11, 1986 [IT] Italy ................... 20759 A/86

[51] Int. Cl.⁴ ................. B65B 35/44; B65B 35/50
[52] U.S. Cl. ..................... 53/516; 53/537; 53/540
[58] Field of Search ............ 53/513, 514, 516, 531, 53/533, 534, 537, 540; 198/422, 424

[56] References Cited

U.S. PATENT DOCUMENTS

| | | | |
|---|---|---|---|
| 3,445,986 | 5/1969 | Godet | 53/536 X |
| 3,512,336 | 5/1970 | Rosecrans | 53/537 |
| 3,633,739 | 1/1972 | Renner et al. | 198/424 X |
| 3,657,860 | 4/1972 | Franklin | 53/537 X |
| 3,920,134 | 11/1975 | Scarpa et al. | 198/422 X |
| 4,147,081 | 4/1979 | Pellaton | 53/516 X |
| 4,262,793 | 4/1981 | Hebenstreit et al. | 198/424 |
| 4,344,523 | 8/1982 | May et al. | 53/537 X |

Primary Examiner—James F. Coan
Assistant Examiner—Steven P. Weihrouch
Attorney, Agent, or Firm—Diller, Ramik & Wight

[57] ABSTRACT

A machine for the packaging of food products of flat, wide type, in particular "lasagne", which comprises the positioning and cutting of the "lasagne" from pasta sheets on a first conveyor means provided with pairs of coupled trays, and the subsequent stacking thereof inside moving-plane storage units, before a preselected number thereof are introduced into an equipment for containing and conveying them to means for introducing them into the packaging boxes.

20 Claims, 4 Drawing Sheets

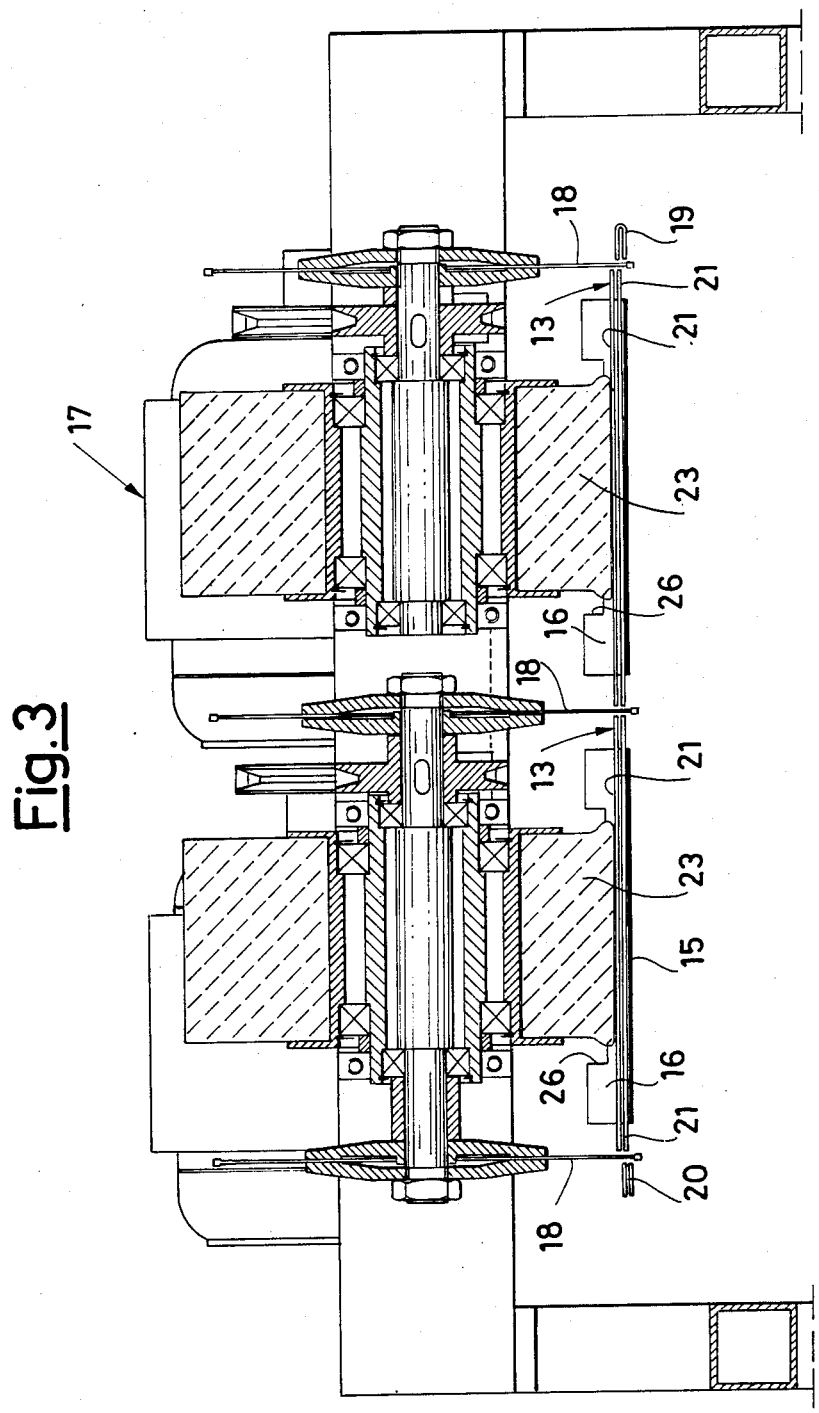

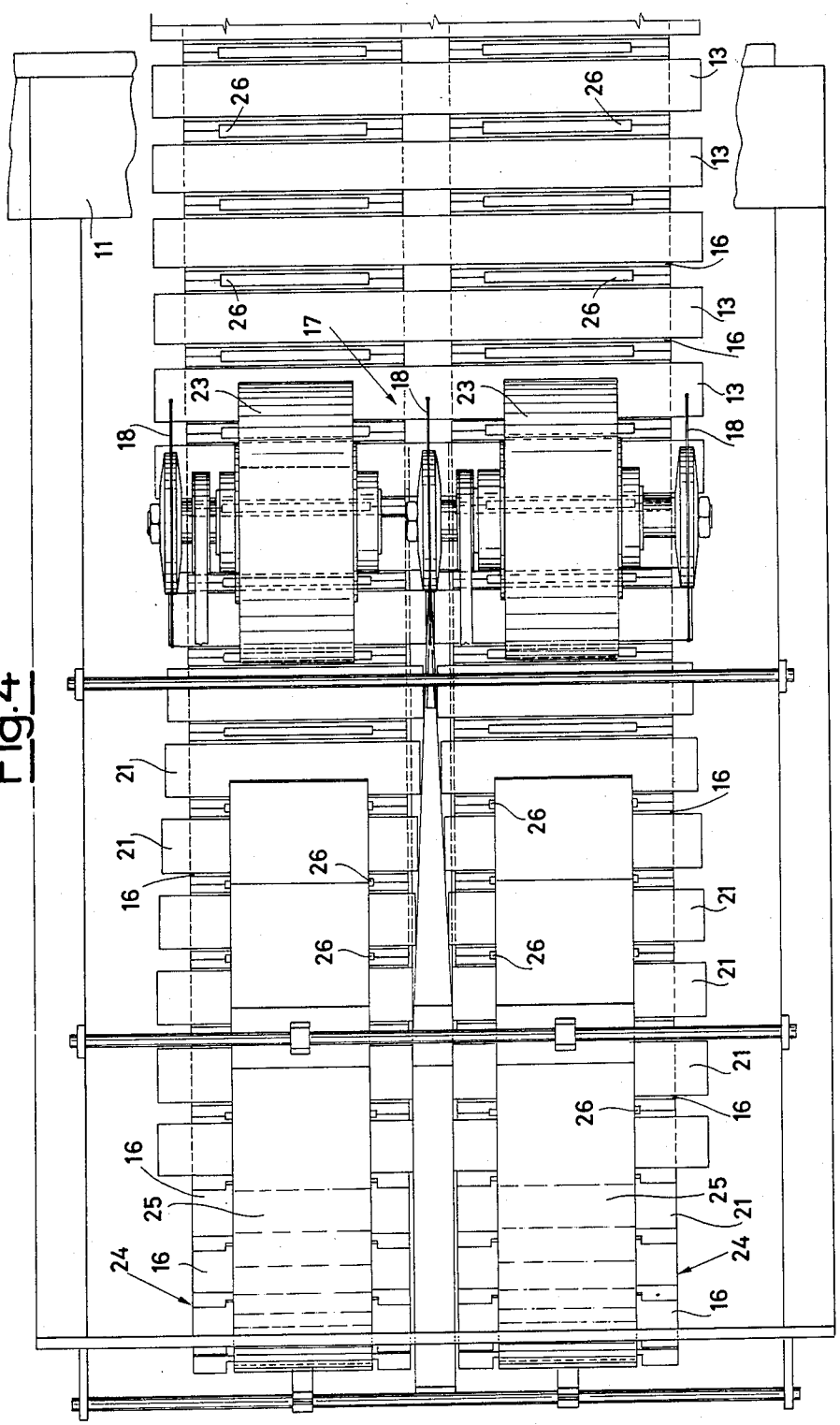

MACHINE FOR PACKAGING FOOD PRODUCTS OF FLAT, WIDE TYPE, IN PARTICULAR PASTA DENOMINATED 'LASAGNA'

FIELD OF THE INVENTION

The present invention relates to a machine for the packaging of feed products of flat, wide type, in particular pasta denominated "lasagna".

BACKGROUND OF THE INVENTION

It is known that the food pasta of flat, wide type, such as the "lasagna" is produced by means of a suitable extruder, and is positioned astraddle of conveyance rods or tubes for being introduced into the drier unit.

The "lasagne" must be subsequently suitably cut and packaged.

In the packaging machines of the prior art, of semi-automatic type, problems occur, concerning the manual transfer, and the orderly positioning of the "lasagne" for obtaining a preestablished amount thereof inside the packaging container.

SUMMARY OF THE INVENTION

A purpose of the present invention is to solve said problems, by, in particular, simplifying the operations of formation of the pre-counted "lasagne" stacks to be inserted into the packaging containers.

These and other purposes according to the present invention are achieved by providing a machine for the packaging of food products of flat, wide type, in particular pasta denominated "lasagna", of the type wherein at the outlet of an extruder a set of pasta sheets are cut and positioned astraddle of the rods of a conveyor means for being delivered, once dried, to a discharge chute, said pasta sheets being interspaced from each other by a pre-established and fixed distance, characterized in that in correspondence of said discharge chute, wherein said sheets of pasta arrange themselves in a horizontal position, a second conveyor means is provided, which is provided with a plurality of two-by-two-paired containment elements, which are interspaced from each other by a distance equalling the distance running between said pasta sheets and are suitable to receive them, which conveys said pasta sheets first under a cutting device for cutting them into pairs of "lasagne", which too are paired, and which then conveys said pasta sheets, by following a curved guide and cooperating with continuous support and containment elements, towards a first pair of movable planes suitable to be opened above a second pair of underlying movable planes which act as a storage unit, said second pair of movable planes being positioned in their turn above a set of containers, which too are arranged side by side and are positioned on means for conveying them towards means of packaging into boxes.

The structural and functional characteristics and the advantages of a packaging machine according to the present invention will result clearer from the following exemplifying and non limitative disclosure as referred to the related drawings, wherein:

FIG. 1 is a schematic, partly sectional elevation view of a packaging machine according to the present invention, FIG. 2 is a transversal sectional view according to path II—II of FIG. 1, FIG. 3 is an enlarged sectional view of the cutting device, and FIG. 4 is an enlarged top view of the bent portion of the conveyor belt bearing the trays containing the "lasagne".

DESCRIPTION OF THE PREFERRED EMBODIMENT

Figure 1:
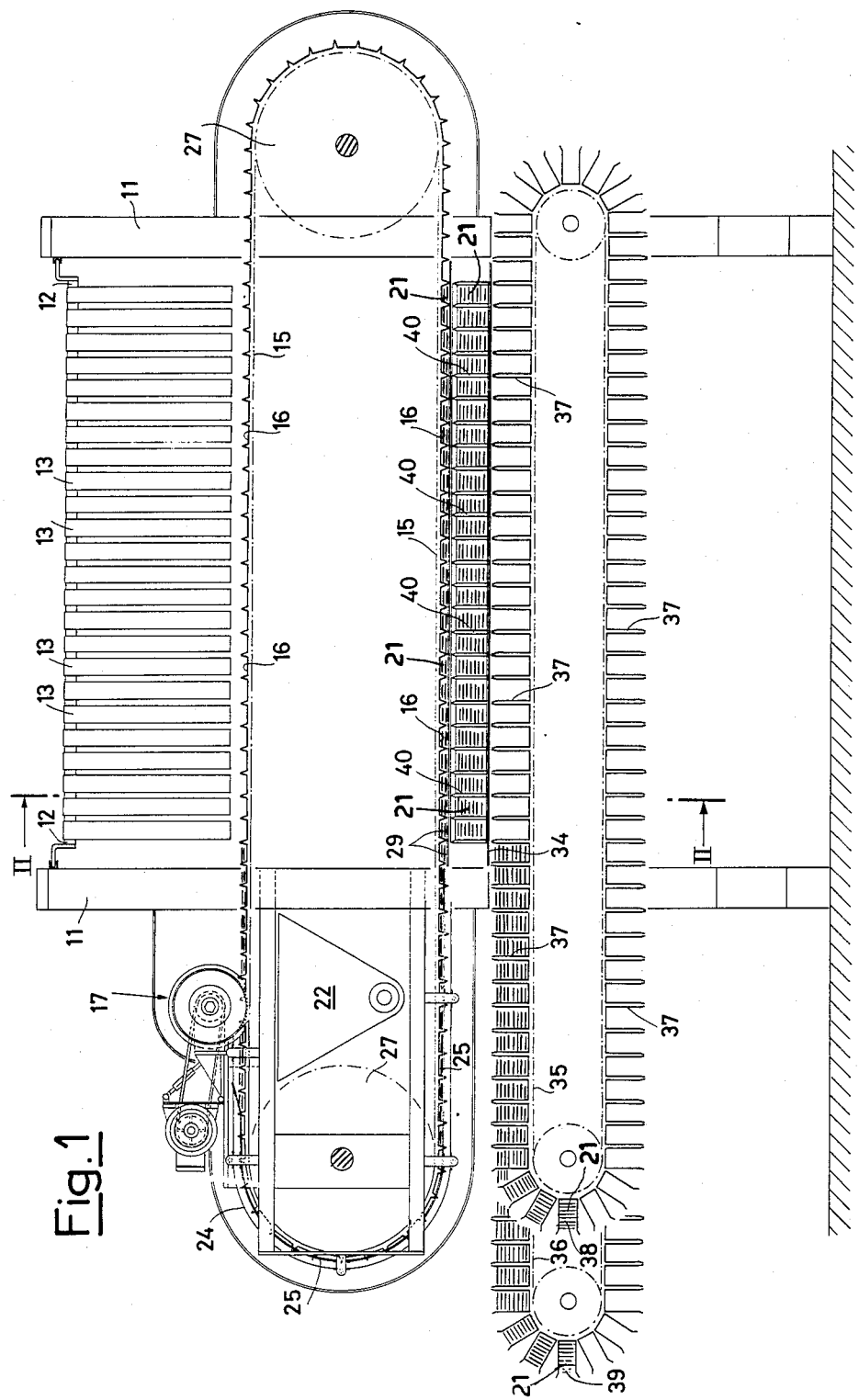
Figure 2:
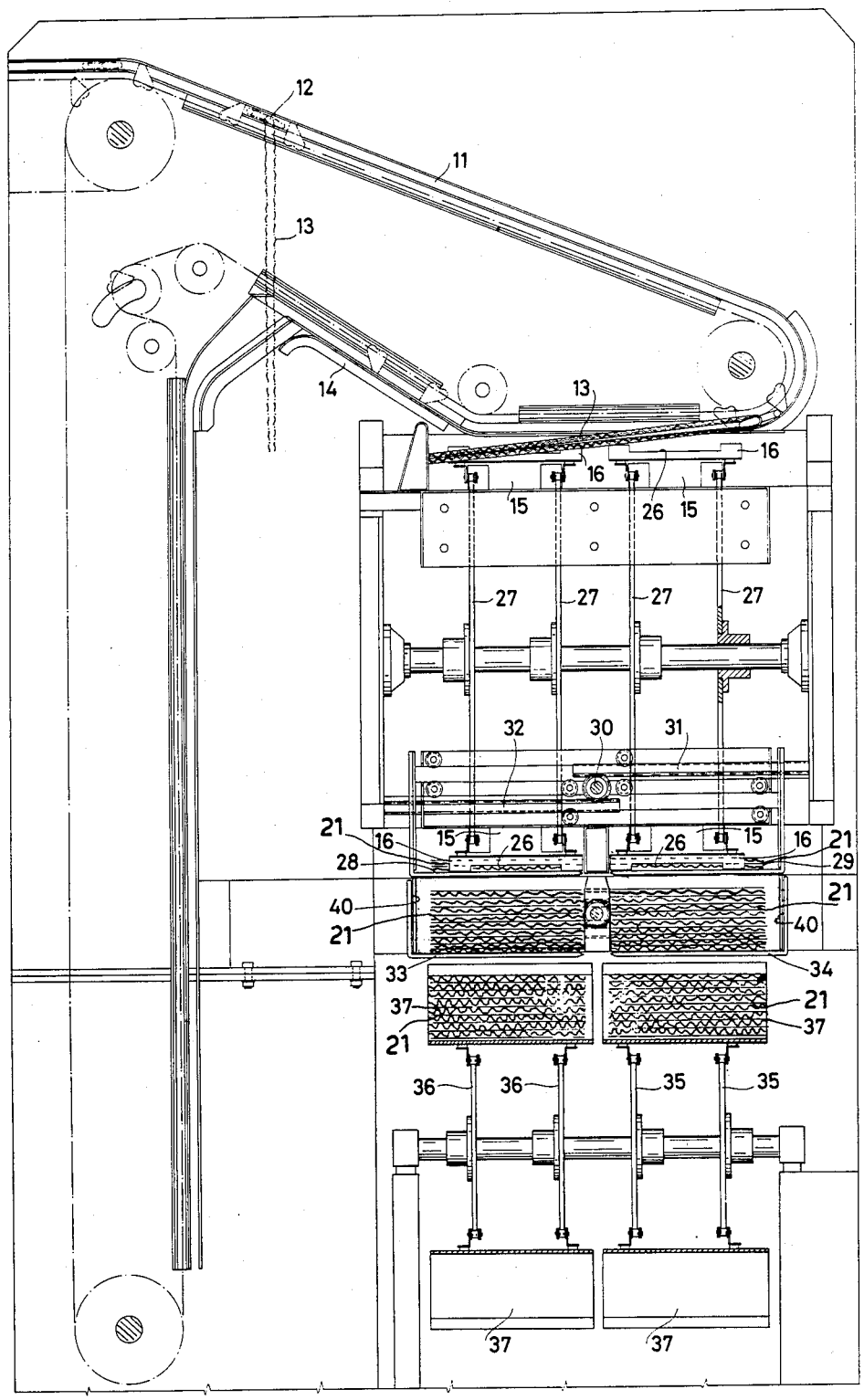

Referring to the drawings, a machine for the packaging of food products, in particular "lasagne", according to the invention, comprises a conveyor means 11 which drives a set of rods or tubes 12 to sequentially move, said rods or tubes 12 bearing a plurality of long pasta sheets 13, i.e., multiples of an individual "lasagna" 21, positioned astraddle thereof and hanging downwards.

By a movement and route having an elongated and narrow reverse-"C"-shape, and also thanks to the presence and cooperation of a chute element 14, the plurality of pasta sheets 13 are obliged to arrange themselves in a nearly horizontal position, in a known way.

It is important to observe that the individual pasta sheets 13 of "lasagne" 21 on rods 12 are separated from each other by a well-defined and constant distance, so that when they are slid out from their related rod 12, they remain spaced apart from each other.

In correspondence of said chute element 14, and under the horizontal portion of the conveyor means 11, a conveyor belt 15 is provided, which bears, constrained to it, trays 16 or equivalent container means. Said trays 16 are preferably positioned, paired two by two, on one single belt, or on two paired belts driven to run in perfect synchronism with each other, and are open atop and in the transversal direction relatively to a closed-loop route, which runs around end opposite wheels 27.

A cutting device 17, e.g., composed by a set of three rotary wheel-blades 18, is positioned above the abovesaid pairs of trays 16 running on the belt conveyor 15, and the three blades 18 are got beside the two trays 16 and inside the central gap between them. By so doing, from each pasta sheet 13 provided on the trays 16, connecting ends 19 and tail end 20 are removed, so that two cut and overlapping "lasagne" 21 are obtained on each tray 16, and the removal of the connection piece 19 and of the tail piece 20 takes place inside an undelying collection unit 22.

It is interesting to observe how, during the step of cutting of the pasta sheet 13, together with the three blades 18 also two revolving pressure elements 23 act, which, by holding the pasta sheets 13 inside the trays 16, cooperate to optimize the cutting of the "lasagne" pairs 21.

The conveyor belt 15 bearing the pairs of trays 16 containing the so-cut "lasagne" 21, running forward along its closed-loop route around the two opposite end wheels 27, enters a bent conveyor portion 24 provided with continuous support elements or curved guides 25 (FIG. 4), which follow the route of the same bent portion 24 of the conveyor belt in correspondence of one of wheels 27 (FIG. 4).

Said continuous support elements 25, in particular, enter a "U"-shaped seat 26 provided beside trays 16, thus keeping the "lasagne" 21 in their place during the closed route of the bent portion 24 until the trays come in correspondence of an underlying horizontal planar route portion.

Along said horizontal planar route portion, the "lasagne" 21 are kept inside the trays 16 by a pair of movable planes 28, 29 arranged as paired couples, which position themselves under the upside-down trays 16, so to keep in place the "lasagne" 21. The couple of movable paired planes 28, 29 can be made translate, to disengage from, and open the trays 16, one that the conveyor belt 15 has stopped, by a motor-driven toothed pinion 30 acting on related complementary toothed bars or racks 31, 32 integral with said pair of movable planes 28,29.

As an alternative, said pair of movable planes 28, 29 can be driven into their opened position by a pair of opposite cylinders synchronized with each other, and constrained to each other, for synchronously opening, by the same toothed pinion 30, which shall be idle, and by the racks 31, 32.

Under said first couple of paired movable planes 28, 29 a second couple of paired movable planes 33, 34 are provided, which act as a storage unit and receive from upper movable planes 28, 29 the "lasagne" 21, in two by two arrangement, until the amount foreseen for being inserted into a packaging box (not shown) is reached.

Also the movement of the second pair of lower movable planes 33, 34 can be achieved in an equivalent way to that as already indicated and disclosed for the pair of first movable planes 28, 29.

Under the second pair of movable planes 33, 34 a conveyor means is provided, e.g., in the form of two paired chains 35, 36, each provided with a set of side-by side paired containers 37, which are open atop, and in the direction along which their are paired, and are so positioned as to receive the amount of "lasagne" 21 which must be introduced into the packaging boxes. Such an end function is performed, e.g., in 38 for the "lasagne" conveyed by chain 35, and in 39 for the "lasagne" conveyed by chain 36, by means of horizontal pushers (not shown) which enter containers 37 laterally and transversely and push the "lasagne" stacks into boxes fed after each other at a predetermined pitch on one single conveyance plane.

It should be noticed that between the pairs of upper movable planes 28, 29 and lower movable planes 33, 34 a set of partition walls or hollow containers 40 are fixedly provided, which are suitable to receive and stack the "lasagne" 21 on each other, or, better, stacked two by two, until the predetermined number per box is reached.

The advancing pitch of the belt conveyor 15 will equal the number of pasta sheets 13 contained above each individual rod 12, to that the "lasagne" packaging can be speeded up as far as possible.

It is important that the pasta sheets 13 are positioned on each rod 12 spaced apart from each other by the same pitch existing between adjacent trays, so that they can come to rest inside said trays, with the belt conveyor 15 being stationary, as fed by the conveyor 11 and conveyed by the chute.

It is easy to realize then how the rods 12 are brought back again, leaving the pasta sheets 13 inside the trays and sliding out from the tail zone 20 of same pasta sheets.

Once that the pasta sheets are placed inside the trays, the belt conveyor 15 is moved forward and, by running under the cutting device 17, allows "lasagne" 21 to be formed, perfectly positioned inside the trays 16, which then enter in correspondence of the continuous support elements 25 until they are translated above the first movable planes 28, 29.

This translational motion takes place for an amount equalling the pasta sheet amount per each rod, to that after one individual shift, of a multiple thereof, the "lasagne" 21 are positioned perfectly lined-up above the first movable planes 28, 29 in correspondence of the containment partition walls 40.

At this point in time, with the belt conveyor 15 being stationary, the first movable planes 28, 29 are opened, and the pairs of "lasagne" 21 fall down, in perfect order, above the second movable planes 33, 34 contained between the partition walls 40.

This operation is repeated until inside the partition walls 40 the prefixed number of "lasagne" is reached. As soon as such a number is reached, also the second movable planes 33, 34 are opened, so that the stacks of "lasagne" 21 are introduced into containers 40, and are closed again soon afterwards, so to be able to receive new pairs of "lasagne" falling down from the first movable planes 28, 29.

The stacks of "lasagne" 21, in a known way, e.g., along two different routes of chains 35 and 36, are slid, by means of pushers (not shown) into the packaging boxes in correspondence of lined-up zones 38 and 39.

Thus, a particularly simple, and, at the same time, relatively rapid machine for packaging flat, wide food products in stacked groups is provided.

Furthermore, by the machine of the invention, any possible mistakes as to the amounts to be introduced are overcome, such amounts being automatically determined, and being equal for all of the containers.

I claim:

1. A machine for packaging flat wide food products comprising first conveyor means for delivering flat, wide food products along a predetermined first path of travel in a first direction toward a first transition area, said first conveyor including a plurality of rods upon each of which is positioned a plurality of flat wide food products in predetermined spaced relationship to each other, second conveyor means including first and second conveyor runs and a bight conveyor run therebetween for receiving the food products from the first conveyor means at said first transition area and conveying the food products to a second transition area, said first and second conveyor runs passing through and in part defining said respective first and second transition areas, said first and second conveyor runs defining respective second and third generally parallel paths of travel in opposite directions, said first direction of travel being generally normal to said second and third directions of travel, said bight conveyor run defining an arcuate transition path of travel which changes the direction of travel between said second conveyor runs second and third directions of travel, said second conveyor means having a plurality of outwardly opening trays spaced relative to each other and to the predetermined spacing of the food products upon said rods to deposit said food products in said trays at said first transition area as each rod passes therethrough, arcuate guide means contiguous said bight conveyor run for preventing the food products from falling from said trays during movement thereof along said arcuate transition path of travel during which the trays are brought into inverted relationship along said second conveyor run, third conveyor means disposed below said second conveyor second run and having a first conveyor run in generally parallel relationship to said second conveyor second run, said third conveyor first conveyor run having a plurality of pockets normally opening toward said trays and being disposed relative to each other to receive the food products therein at said second transition area, storage means at said second transition area generally between said first conveyor second run and third conveyor first run for accumulating the food products from the second conveyor second run before depositing the accumulated food products in the pockets, said storage means including support means for supporting the food products as it accumulates, means for moving said support means in a direction generally normal to said second conveyor second run direction of travel whereby the accumulated food products will drop into said pockets, means for preventing the food products from dropping out of said trays during movement of said second conveyor second run in said third direction, and means for selectively moving said preventing means to permit the food products to drop out of said trays and upon said storage means support means for subsequent discharge into said pockets.

2. The packaging machine as defined in claim 1 including cutting means positioned along said second conveyor means first conveyor run for cutting the food products into at least two food product portions.

3. The packaging machine as defined in claim 1 including cutting means positioned along said second conveyor means first conveyor run for cutting the food products into at least two food product portions, and said cutting means further being so positioned along said second conveyor means first conveyor run for trimming at least one end of each two food product portions.

4. The packaging machines as defined in claim 1 wherein said storage means include a plurality of partition walls, each pair of adjacent partition walls define one of said pockets, and each pair of adjacent partition walls being spaced from each other a distance corresponding to the predetermined spaced relationship of the food products upon said plurality of rods thereby stacking the food products as the same accummulate in the pockets.

5. The packaging machine as defined in claim 1 including cutting means positioned along said second conveyor means first conveyor run for cutting the food products into at least two food product portions, said cutting means further being so positioned along said second conveyor means first conveyor run for trimming at least one end of each two food product portions, and said cutting means include at least three relatively spaced cutting blades.

6. The packaging machine as defined in claim 1 including cutting means positioned along said second conveyor means first conveyor run for cutting the food products into at least two food product portions, said cutting means further being so positioned along said second conveyor means first conveyor run for trimming at least one end of each two food product portions, and said cutting means include at least three relatively spaced rotary cutting blades.

7. The packaging machines as defined in claim 3 wherein said storage means include a plurality of partition walls, each pair of adjacent partition walls define one of said pockets, and each pair of adjacent partition walls being spaced from each other a distance corresponding to the predetermined spaced relationship of the food products upon said plurality of rods thereby stacking the food products as the same accummulate in the pockets.

8. The packaging machine as defined in claim 3 wherein said support means include two generally planar supports disposed generally parallel to said first conveyor means second conveyor run, and said support moving means moves said generally planar supports away from each other to effect food products dropping into said pockets.

9. The packaging machine as defined in claim 3 wherein said preventing means are moved in a direction generally normal to said second conveyor second run direction of travel, said preventing means include two generally planar supports disposed generally parallel to said first conveyor means second conveyor run and said third conveyor means first conveyor run, and said preventing means moving means moves said generally planar supports away from each other to permit food products to drop out of said trays and upon said storage means support means.

10. The packaging machine as defined in claim 3 wherein said preventing means are moved in a direction generally normal to said second conveyor second run direction of travel, said preventing means include two generally planar supports disposed generally parallel to said first conveyor means second conveyor run and said third conveyor means first conveyor run, said preventing means moving means moves said generally planar supports away from each other to permit food products to drop out of said trays and upon said storage means support means, said support means include two generally planar supports disposed generally parallel to said first conveyor means second conveyor run, and said support moving means moves said last-mentioned generally planar supports away from each other to effect food products dropping into said pockets.

11. The packaging machines as defined in claim 6 wherein said storage means include a plurality of partition walls, each pair of adjacent partition walls define one of said pockets, and each pair of adjacent partition walls being spaced from each other a distance corresponding to the predetermined spaced relationship of the food products upon said plurality of rods thereby stacking the food products as the same accummulate in the pockets.

12. The packaging machine as defined in claim 6 wherein said support means include two generally planar supports disposed generally parallel to said first conveyor means second conveyor run, and said support moving means moves said generally planar supports away from each other to effect food products dropping into said pockets.

13. The packaging machine as defined in claim 1 including cutting means positioned along said second conveyor means first conveyor run for cutting the food products into at least two food product portions, said cutting means further being so positioned along said second conveyor means first conveyor run for trimming at least one end of each two food product portions, said cutting means include at least three relatively spaced rotary cutting blades, and one rotary pressure element between each adjacent two of said rotary cutting blades for applying pressure upon the food products during the cutting thereof.

14. The packaging machine as defined in claim 1 including means for stepwise moving said second conveyor means a distance corresponding to a predetermined length of a group of the pockets along said third conveyor means first conveyor run whereby upon selective movement of said preventing means the food products drop out of said trays along a length of said first conveyor means second conveyor run corresponding to said predetermined length.

15. The packaging machine as defined in claim 1 wherein said preventing means are moved in a direction generally normal to said second conveyor second run direction of travel.

16. The packaging machine as defined in claim 1 wherein said support means include two generally planar supports disposed generally parallel to said first conveyor means second conveyor run, and said support moving means moves said generally planar supports away from each other to effect food products dropping into said pockets.

17. The packaging machine as defined in claim 1 wherein said preventing means are moved in a direction generally normal to said second conveyor second run direction of travel, said preventing means include two generally planar supports disposed generally parallel to said first conveyor means second conveyor run and said third conveyor means first conveyor run, and said preventing means moving means moves said generally planar supports away from each other to permit food products to drop out of said trays and upon said storage means support means.

18. The packaging machine as defined in claim 1 wherein said preventing means are moved in a direction generally normal to said second conveyor second run direction of travel, said preventing means include two generally planar supports disposed generally parallel to said first conveyor means second conveyor run and said third conveyor means first conveyor run, said preventing means moving means moves said generally planar supports away from each other to permit food products to drop out of said trays and upon said storage means support means, said support means include two generally planar supports disposed generally parallel to said first conveyor means second conveyor run, and said support moving means moves said last-mentioned generally planar supports away from each other to effect food products dropping into said pockets.

19. The packaging machine as defined in claim 6 wherein said preventing means are moved in a direction generally normal to said second conveyor second run direction of travel, said preventing means include two generally planar supports disposed generally parallel to said first conveyor means second conveyor run and said third conveyor means first conveyor run, and said preventing means moving means moves said generally planar supports away from each other to permit food products to drop out of said trays and upon said storage means support means.

20. The packaging machine as defined in claim 6 wherein said preventing means are moved in a direction generally normal to said second conveyor second run direction of travel, said preventing means include two generally planar supports disposed generally parallel to said first conveyor means second conveyor run and said third conveyor means first conveyor run, said preventing means moving means moves said generally planar supports away from each other to permit food products to drop out of said trays and upon said storage means support means, said support means include two generally planar supports disposed generally parallel to said first conveyor means second conveyor run, and said support moving means moves said last-mentioned generally planar supports away from each other to effect food products dropping into said pockets.

* * * * *